US010012731B2

(12) United States Patent
Pelin et al.

(10) Patent No.: US 10,012,731 B2
(45) Date of Patent: Jul. 3, 2018

(54) SONAR MAPPING SYSTEM

(71) Applicants: Per Pelin, Torslanda (SE); Scott A. Harrington, Decatur, GA (US)

(72) Inventors: Per Pelin, Torslanda (SE); Scott A. Harrington, Decatur, GA (US)

(73) Assignee: Johnson Outdoors Inc., Racine, WI (US)

( * ) Notice: Subject to any disclaimer, the term of this patent is extended or adjusted under 35 U.S.C. 154(b) by 474 days.

(21) Appl. No.: 14/677,389

(22) Filed: Apr. 2, 2015

(65) Prior Publication Data

US 2015/0285909 A1  Oct. 8, 2015

Related U.S. Application Data

(60) Provisional application No. 61/974,505, filed on Apr. 3, 2014.

(51) Int. Cl.
| *G01S 15/89* | (2006.01) |
| *G01S 7/60* | (2006.01) |
| *G01S 15/96* | (2006.01) |
| *G01S 7/521* | (2006.01) |
| *G01S 7/62* | (2006.01) |
| *G01S 15/42* | (2006.01) |

(52) U.S. Cl.
CPC .............. *G01S 15/89* (2013.01); *G01S 7/521* (2013.01); *G01S 7/60* (2013.01); *G01S 7/6218* (2013.01); *G01S 7/6272* (2013.01); *G01S 15/42* (2013.01); *G01S 15/96* (2013.01)

(58) Field of Classification Search
CPC .......... G01S 15/89; G01S 15/42; G01S 15/96; G01S 7/521; G01S 7/60; G01S 7/6218; G01S 7/6272
See application file for complete search history.

(56) References Cited

U.S. PATENT DOCUMENTS

| 3,548,370 A | 12/1970 | Hoxsie |
| 3,683,324 A | 8/1972 | Hoxsie |

(Continued)

OTHER PUBLICATIONS

Maxsea; MaxSea Marine Navigation Software; internet publication printed Feb. 27, 2015; 3 pages; www.maxsea.com/products/modules/pbg.

(Continued)

*Primary Examiner* — Seahvosh Nikmanesh
(74) *Attorney, Agent, or Firm* — Reinhart Boerner Van Deuren P.C.

(57) ABSTRACT

A sonar mapping system that includes a sonar transducer assembly configured for mounting on a watercraft, and a display configured to show a topographical chart of a body of water. The sonar mapping system further includes a processor coupled to the sonar transducer assembly and display. The processor is configured to create the topographical chart in real time, and to update the topographical chart in real time, based on sonar data provided by the sonar transducer assembly. The processor is also configured to render the created or updated topographical chart on the display. The sonar mapping system has memory accessible by the processor and configured to store the topographical chart rendered by the processor, and to store the sonar data provided by the sonar transducer assembly.

18 Claims, 7 Drawing Sheets

(56) References Cited

U.S. PATENT DOCUMENTS

| | | | |
|---|---|---|---|
| 3,721,124 A | 3/1973 | Franks |
| 3,740,705 A | 6/1973 | Lowrance |
| 3,747,053 A | 7/1973 | Austin |
| 3,747,413 A | 7/1973 | Barrett et al. |
| 3,752,431 A | 8/1973 | McBride |
| 3,781,777 A | 12/1973 | Lowrance |
| 3,782,170 A | 1/1974 | Cramer |
| 3,797,448 A | 3/1974 | Cramer |
| 3,808,731 A | 5/1974 | Lowrance |
| 3,835,447 A | 9/1974 | Lowrance |
| 3,845,928 A | 11/1974 | Barrett et al. |
| 3,946,295 A | 3/1976 | Moore |
| D243,589 S | 3/1977 | Moore |
| D244,434 S | 5/1977 | Moore |
| 4,110,727 A | 8/1978 | Kriege |
| 4,186,372 A | 1/1980 | Maloy |
| 4,189,702 A | 2/1980 | Maloy |
| 4,322,827 A | 3/1982 | Weber |
| 4,369,508 A | 1/1983 | Weber |
| 4,420,824 A | 12/1983 | Weber |
| 4,456,210 A | 6/1984 | McBride |
| 4,480,809 A | 11/1984 | Healey |
| D278,690 S | 5/1985 | Steensland et al. |
| 4,590,679 A | 5/1986 | Livings et al. |
| 4,612,633 A | 9/1986 | Weber |
| 4,862,819 A | 9/1989 | Fawcett |
| 4,879,697 A | 11/1989 | Lowrance et al. |
| 4,894,922 A | 1/1990 | Lovelock |
| 4,907,208 A | 3/1990 | Lowrance et al. |
| 4,938,165 A | 7/1990 | Williams et al. |
| 5,109,364 A | 4/1992 | Stiner |
| D329,615 S | 9/1992 | Stiner |
| D329,616 S | 9/1992 | Stiner |
| 5,235,927 A | 8/1993 | Singh et al. |
| 5,313,397 A | 5/1994 | Singh et al. |
| 5,327,398 A | 7/1994 | Wansley et al. |
| 5,491,636 A | 2/1996 | Robertson et al. |
| 5,537,380 A | 7/1996 | Sprankle, Jr. et al. |
| D373,568 S | 9/1996 | Bloom et al. |
| 5,574,700 A | 11/1996 | Chapman |
| D380,664 S | 7/1997 | Currier et al. |
| 5,697,319 A | 12/1997 | Steensland et al. |
| D390,092 S | 2/1998 | Currier et al. |
| 5,771,205 A | 6/1998 | Currier et al. |
| 5,852,589 A | 12/1998 | Wilson et al. |
| 5,865,403 A | 2/1999 | Covell |
| 5,887,376 A | 3/1999 | Currier et al. |
| 5,930,200 A | 7/1999 | Kabel |
| 6,108,269 A | 8/2000 | Kabel |
| 6,335,905 B1 | 1/2002 | Kabel |
| 6,345,179 B1 | 2/2002 | Wiegers et al. |
| 6,377,516 B1 | 4/2002 | Whiteside et al. |
| 6,466,514 B1 | 10/2002 | Kabel |
| 6,493,894 B1 | 12/2002 | Whiteside et al. |
| 6,529,381 B1 | 3/2003 | Schoenfish |
| 6,650,884 B1 | 11/2003 | Wiegers et al. |
| 6,678,589 B2 | 1/2004 | Robertson et al. |
| 6,687,138 B1 | 2/2004 | Poindexter |
| 6,687,615 B1 | 2/2004 | Krull et al. |
| 6,693,586 B1 | 2/2004 | Walters et al. |
| 6,700,787 B1 | 3/2004 | Beseth et al. |
| 6,703,998 B1 | 3/2004 | Kabel et al. |
| 6,708,112 B1 | 3/2004 | Beesley et al. |
| 6,711,478 B2 | 3/2004 | Hilb |
| 6,721,651 B1 | 4/2004 | Minelli |
| 6,735,542 B1 | 5/2004 | Burgett et al. |
| 6,745,115 B1 | 6/2004 | Chen et al. |
| 6,751,552 B1 | 6/2004 | Minelli |
| 6,768,450 B1 | 7/2004 | Walters et al. |
| 6,778,388 B1 | 8/2004 | Minelli |
| 6,789,012 B1 | 9/2004 | Childs et al. |
| 6,795,770 B1 | 9/2004 | Hanshew et al. |
| 6,798,378 B1 | 9/2004 | Walters |
| 6,798,673 B1 | 9/2004 | Poindexter |
| 6,801,854 B1 | 10/2004 | Pemble et al. |
| 6,801,855 B1 | 10/2004 | Walters et al. |
| 6,809,657 B1 | 10/2004 | Parker et al. |
| 6,809,940 B1 | 10/2004 | Poindexter |
| 6,810,322 B2 | 10/2004 | Lai |
| 6,816,782 B1 | 11/2004 | Walters et al. |
| 6,819,549 B1 | 11/2004 | Lammers-Meis et al. |
| 6,822,402 B1 | 11/2004 | Poindexter |
| 6,833,851 B1 | 12/2004 | Brunk |
| 6,839,624 B1 | 1/2005 | Beesley et al. |
| 6,839,631 B1 | 1/2005 | Pemble et al. |
| 6,844,845 B1 | 1/2005 | Whiteside et al. |
| 6,845,318 B1 | 1/2005 | Moore et al. |
| 6,845,320 B2 | 1/2005 | Tompkins et al. |
| 6,845,323 B1 | 1/2005 | Beason et al. |
| 6,847,890 B1 | 1/2005 | Childs et al. |
| 6,850,188 B1 | 2/2005 | Lee et al. |
| 6,850,844 B1 | 2/2005 | Walters et al. |
| 6,853,955 B1 | 2/2005 | Burrell et al. |
| 6,856,274 B1 | 2/2005 | Johnson |
| 6,856,893 B2 | 2/2005 | Beesley et al. |
| 6,856,898 B1 | 2/2005 | Tompkins et al. |
| 6,856,899 B2 | 2/2005 | Krull et al. |
| 6,856,900 B1 | 2/2005 | Childs et al. |
| 6,871,138 B1 | 3/2005 | Minelli |
| 6,871,144 B1 | 3/2005 | Lee |
| 6,879,114 B2 | 4/2005 | Jales et al. |
| 6,882,932 B2 | 4/2005 | Tompkins et al. |
| 6,892,135 B1 | 5/2005 | Krull et al. |
| 6,898,525 B1 | 5/2005 | Minelli |
| 6,899,562 B1 | 5/2005 | Ruff et al. |
| 6,909,946 B1 | 6/2005 | Kabel et al. |
| 6,927,983 B1 | 8/2005 | Beseth et al. |
| 6,934,657 B1 | 8/2005 | Carlson et al. |
| 6,943,771 B2 | 9/2005 | Kabel et al. |
| 6,950,372 B2 | 9/2005 | Sogaard |
| D518,396 S | 4/2006 | Jopling |
| 7,062,374 B1 | 6/2006 | Walters et al. |
| 7,063,297 B2 | 6/2006 | Jopling |
| 7,106,657 B2 | 9/2006 | Sogaard |
| 7,230,882 B2 | 6/2007 | Swisher |
| 7,236,426 B2 | 6/2007 | Turner et al. |
| 7,268,703 B1 | 9/2007 | Kabel et al. |
| 7,298,320 B1 | 11/2007 | Whiteside et al. |
| D565,077 S | 3/2008 | Sakamaki et al. |
| D565,977 S | 4/2008 | Ross et al. |
| 7,386,374 B1 | 6/2008 | Orf et al. |
| 7,430,461 B1 | 9/2008 | Michaels |
| 7,441,189 B2 | 10/2008 | Michaels |
| 7,520,481 B2 | 4/2009 | Jopling |
| 7,543,241 B1 | 6/2009 | Brunk |
| 7,602,302 B2 | 10/2009 | Hokuf et al. |
| 7,610,148 B1 | 10/2009 | Walters et al. |
| 7,646,329 B2 | 1/2010 | Britton et al. |
| 7,652,952 B2 | 1/2010 | Betts et al. |
| 7,710,825 B2 | 5/2010 | Betts et al. |
| 7,729,203 B2 | 6/2010 | Betts et al. |
| 7,729,684 B1 | 6/2010 | Straub |
| 7,755,974 B2 | 7/2010 | Betts et al. |
| 7,787,857 B2 | 8/2010 | Peterman |
| 7,825,858 B2 | 11/2010 | Blessing et al. |
| 7,889,085 B2 | 2/2011 | Downey et al. |
| 7,973,705 B2 | 7/2011 | Cunning et al. |
| 8,224,562 B2 | 7/2012 | Katzer |
| 8,291,757 B2 | 10/2012 | Johnson et al. |
| 8,300,499 B2 | 10/2012 | Coleman et al. |
| 8,301,714 B2 | 10/2012 | Johnson et al. |
| 8,305,840 B2 | 11/2012 | Maguire |
| 8,514,658 B2 | 8/2013 | Maguire |
| 8,624,776 B2 | 1/2014 | Jales et al. |
| 9,268,020 B2 * | 2/2016 | Coleman ................. G01S 7/521 |
| 9,702,966 B2 * | 7/2017 | Batcheller et al. ...... G01S 7/003 |
| | | 367/88 |
| 2006/0278789 A1 | 12/2006 | Jopling |
| 2008/0191935 A1 | 8/2008 | Tidwell |
| 2008/0192575 A1 | 8/2008 | Coleman |
| 2008/0195242 A1 | 8/2008 | Tidwell |
| 2008/0195313 A1 | 8/2008 | Coleman |
| 2010/0117923 A1 | 5/2010 | Storz |
| 2010/0199225 A1 | 8/2010 | Coleman et al. |

(56) References Cited

U.S. PATENT DOCUMENTS

| | | | |
|---|---|---|---|
| 2011/0013484 A1 | 1/2011 | Coleman et al. | |
| 2011/0013485 A1 | 1/2011 | Maguire | |
| 2013/0208568 A1* | 8/2013 | Coleman | G01S 7/521 367/88 |
| 2013/0215719 A1 | 8/2013 | Betts et al. | |
| 2014/0269164 A1 | 9/2014 | Betts et al. | |

OTHER PUBLICATIONS

Maxsea; Getting Started with MaxSea 2D/3D/PBG; installation instructions; 3 pages; known as of filing date of application (Apr. 4, 2015).

DrDepth—MVP; DrDepth Sea bottom mapping software; pages printed from the internet; 2017; 4 pages; http://mob.drdepth2.se/mvphelp.php.

DrDepth—Nomad; DrDepth Sea bottom mapping software; pages printed from the internet; 2017; 4 pages; http://mob.drdepth2.se/nomadhelp.php.

Download DrDepth Nomad APK 1.9.9—Bypass Region-Lock; DrDepth Nomad; pages printed from the internet; 2017; 6 pages http://m.downloadatoz.com/drdepth-nomad/com.drdepth.drdepthnomad/.

DrDepth Nomad—Android Informer. DrDepth Nomad Is an Extended Version of DrDepth . . .; DrDepth Nomad; pages printed from the internet; 2017; 2 pages; http://drdepth-nomad.android.informer.com/.

Video; "Humminbird 360 Imaging" uploaded Feb. 23, 2012: https://www.youtube.com/watch?v=bsOGUx7O3nk.

Furuno; Furuno DFF1-UHD TruEcho CHIRP Fish Finder; internet brochure http://www.furunousa.com/ProductDocuments/DFF1-UHD_Brochure.pdf; known at least as of the filing date of the application (Apr. 2, 2015); 2 pages.

Series of screenshots from video of DrDepth product features. Video uploaded Jan. 25, 2008. https://www.youtube.com/watch?v=Hd3rn_LNukE Screenshots taken at the following times of the video: 0.13 (Attachment 12) 0.26 (Attachment 13) 2.46 (Attachment 14) 2.51 (Attachment 15) 3.09 (Attachment 16) 3.18 (Attachment 17).†

Series of screenshots from video linked to by WASSP product announcement (see Cite 1). Video uploaded Dec. 22, 2013http://www.youtube.com/watch?v=J6CTylHzuFEScreenshots taken at the following times of the video:0.18 (Attachment 2)0.43 (Attachment 3)0.55 (Attachment 4)1.28 (Attachment 5)1.30 (Attachment 6)1.56 (Attachment 7)2.02 (Attachment 8)2.00 (Attachment 9)3.59 (Attachment 10).†

Press release published at WASSP website Jan. 14 2014; WASSP Product Announcement; WAASP Ltd., Auckland, New Zealand. Available at:http://wassp.com/news-events/wassp-goes-wireless-with-new-remote-mapping-system/.†

Screenshot from Humminbird 360 degree sonar display description. Video uploaded Feb. 26, 2012 https://www.youtube.com/watch?v=VetZhhulQ0YScreenshots taken at the following time of the video: 0.12 (Attachment 11).†

\* cited by examiner
† cited by third party

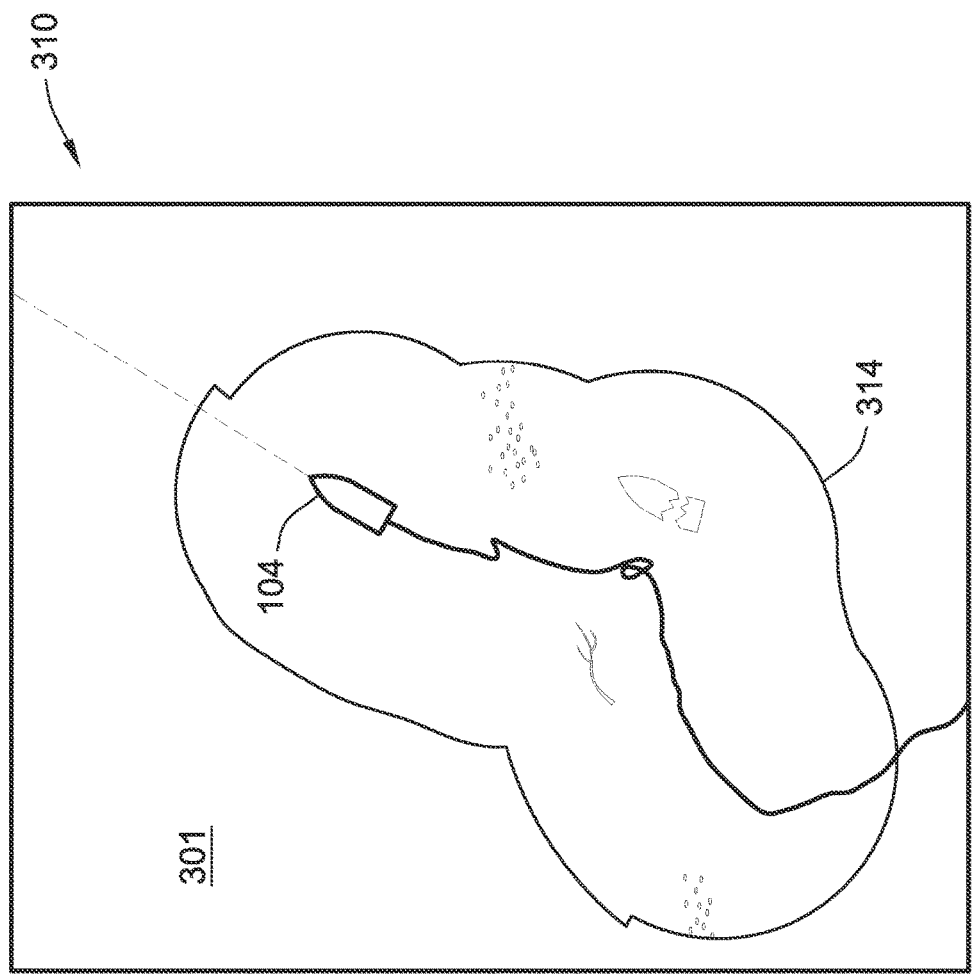

SONAR MAPPING SYSTEM

CROSS-REFERENCE TO RELATED PATENT APPLICATIONS

This patent application claims the benefit of U.S. Provisional Patent Application No. 61/974,505, filed Apr. 3, 2014, the entire teachings and disclosure of which are incorporated herein by reference thereto.

FIELD OF THE INVENTION

This invention generally relates to a sonar mapping system.

BACKGROUND OF THE INVENTION

Sonar transducer assemblies are sometimes mounted on the hulls of watercrafts for various purposes, fish finding for example. U.S. Patent Publication No. 2013/0215719, published on Aug. 22, 2013, discloses a system including a sonar transducer assembly, deployed below the bottom of a boat hull, which provides 360-degree sonar imaging, the entire teachings and disclosure of which is incorporated herein by reference thereto. U.S. Patent Publication No. 2014/0269164, published Sep. 18, 2014, discloses a system including a sonar transducer assembly, which provides sonar imaging for a predetermined sector, the entire teachings and disclosure of which is incorporated herein by reference thereto. Various embodiments of a system for sonar imaging is disclosed in the following patents: U.S. Pat. No. 7,652,952 issued on Jan. 26, 2010 to Betts et al.; U.S. Pat. No. 7,710,825 issued on May 4, 2010 to Betts et al.; U.S. Pat. No. 7,729,203 issued on Jun. 1, 2010 to Betts et al.; and U.S. Pat. No. 7,755,974 issued on Jul. 13, 2010 to Betts et al., the entire teachings and disclosures of which are incorporated herein by reference thereto.

It is often advantageous for anglers to have detailed maps or charts of the lakes, rivers, or other bodies of water in which they fish. Charts showing the topography of the lake bed, river bed, or sea bed may inform the angler as to the best location for catching a particular type of fish. Embodiments of the present invention advance the state of the art with respect to the use of sonar transducers on watercrafts in a way that addresses some of the aforementioned needs of anglers.

These and other advantages of the invention, as well as additional inventive features, will be apparent from the description of the invention provided herein.

BRIEF SUMMARY OF THE INVENTION

In one aspect, embodiments of the invention provide a sonar mapping system that includes a sonar transducer assembly configured for mounting on a watercraft, and a display configured to show a topographical chart of a body of water. The sonar mapping system further includes a processor coupled to the sonar transducer assembly and display. The processor is configured to create the topographical chart in real time, and to update the topographical chart in real time, based on sonar data provided by the sonar transducer assembly. The processor is also configured to render the created or updated topographical chart on the display. The sonar mapping system has memory accessible by the processor and configured to store the topographical chart rendered by the processor, and to store the sonar data provided by the sonar transducer assembly. In certain embodiments, the processor is integrated into the sonar transducer assembly.

In a particular embodiment, the processor is configured to convert the sonar data in real time into topographical data rendered on the display for one of a lakebed, riverbed, and seabed. The processor may be configured to estimate topographical data to fill in missing portions of topographical data adjacent the topographical data gathered via the sonar transducer assembly. In certain embodiments, the topographical data includes one or more contour lines indicative of a water depth. In alternate embodiments, the topographical data includes bathymetric tints indicative of a water depth. The colors of the bathymetric tints may be selectable by a user.

The topographical data may include bathymetric tints indicative of a hardness of the lakebed, riverbed, or seabed surface. The colors of the hardness-indicating bathymetric tints may be selectable by a user. Similarly, the colors of any topographical chart generated by the processor may be selectable by a user.

In some embodiments, a chart for a body of water is stored in the memory, and the processor updates topographical or bathymetric data for the chart based on the sonar data provided by the sonar transducer assembly. In particular embodiments, updating the topographical chart in real time comprises overwriting stored topographical data with new topographical data acquired and converted form sonar data in real time.

In a particular embodiment, the processor is configured to generate a 3-D rendering based on sonar data collected by the sonar transducer assembly, and wherein the 3-D rendering is shown on the display. In some embodiments, a user can save the 3-D rendering in the memory. Different features of the 3-D rendering may be shown in different colors. The colors of the 3-D rendering may be selectable by a user of the sonar mapping system.

In a particular embodiment, the processor is configured to convert the sonar data in real time into topographical data for one of a lakebed, riverbed, and seabed. The topographical data may include one or more contour lines indicative of a water depth, or, alternatively, may include bathymetric tints indicative of a water depth. The sonar mapping system may include a connection for a portable memory device, wherein the processor is configured to access portable memory device, the portable memory device including at least one of a USB drive, and SD card, optical storage media, and magnetic storage media.

In another aspect, embodiments of the invention provide a sonar mapping system that includes a sonar transducer assembly configured for mounting on a watercraft, and configured to provide sonar data for a 360-degree area surrounding the watercraft, or for a portion of a 360-degree area using a sector-scanning device, and a display configured to show underwater images based on data from the sonar transducer assembly. The sonar mapping system also includes a processor coupled to the sonar transducer assembly and to the display. The processor is configured to convert sonar data from the sonar transducer assembly into the underwater images rendered on the display. The processor is also configured to overlay the underwater images, in real time, onto a previously-stored chart for a body of water, or to create a new chart, in real time, that includes the underwater images. The sonar mapping system also includes memory accessible by the processor. The processor is configured to store, in the memory, the new chart with underwater images or the previously-stored chart with overlaid underwater images.

In a particular embodiment, the underwater images are shown on the display as bathymetric tints in which different features of the underwater images are represented by a plurality of colors. In more particular embodiments, at least one of the plurality of colors is selectable by a user of the sonar mapping system.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 7 is an exemplary screenshot of the display for the sonar mapping system as it would appear with a 360-degree sonar imaging system, in accordance with an embodiment of the invention.

The accompanying drawings include a number of exemplary charts as they would be displayed on the display of an embodiment of the sonar mapping system.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
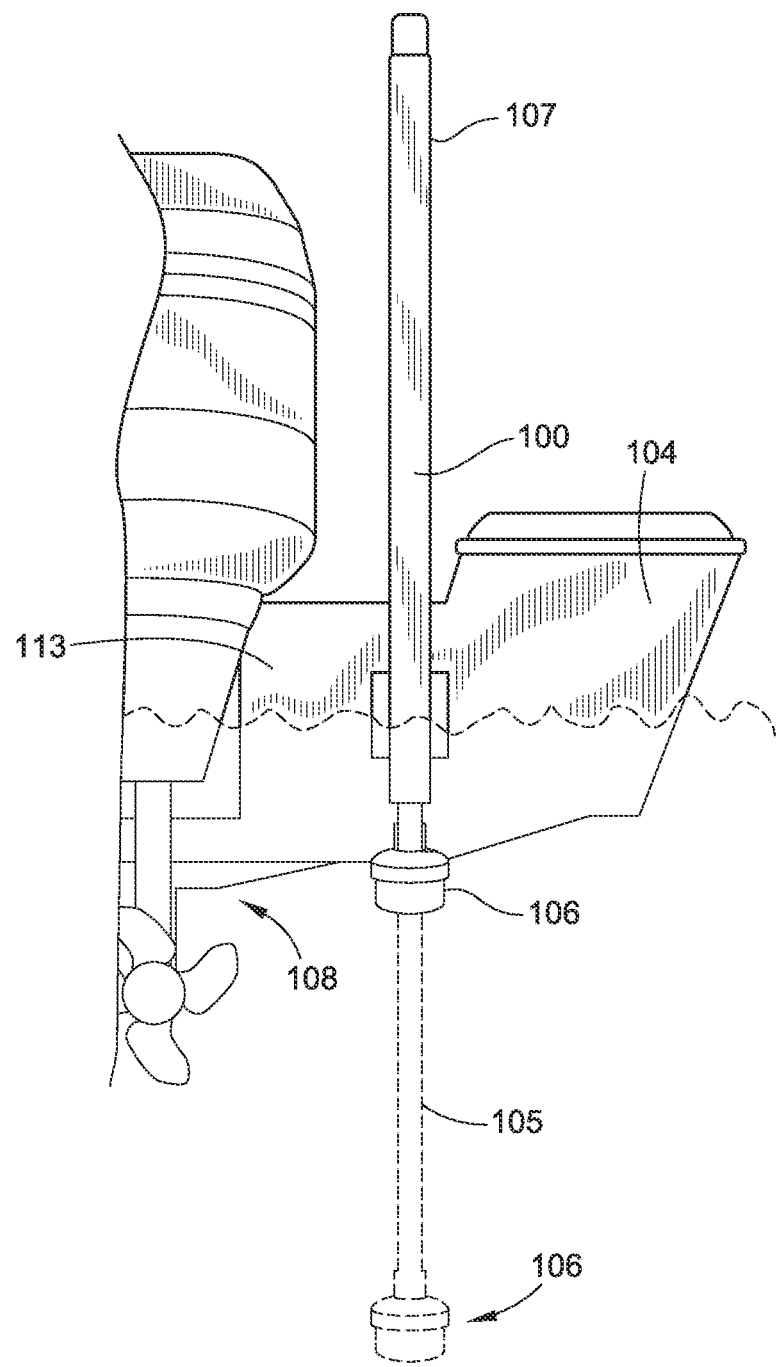
FIG. 1 is a plan view of a boat with a transom-mounted sonar transducer assembly, according to an embodiment of the invention.
Figure 2:
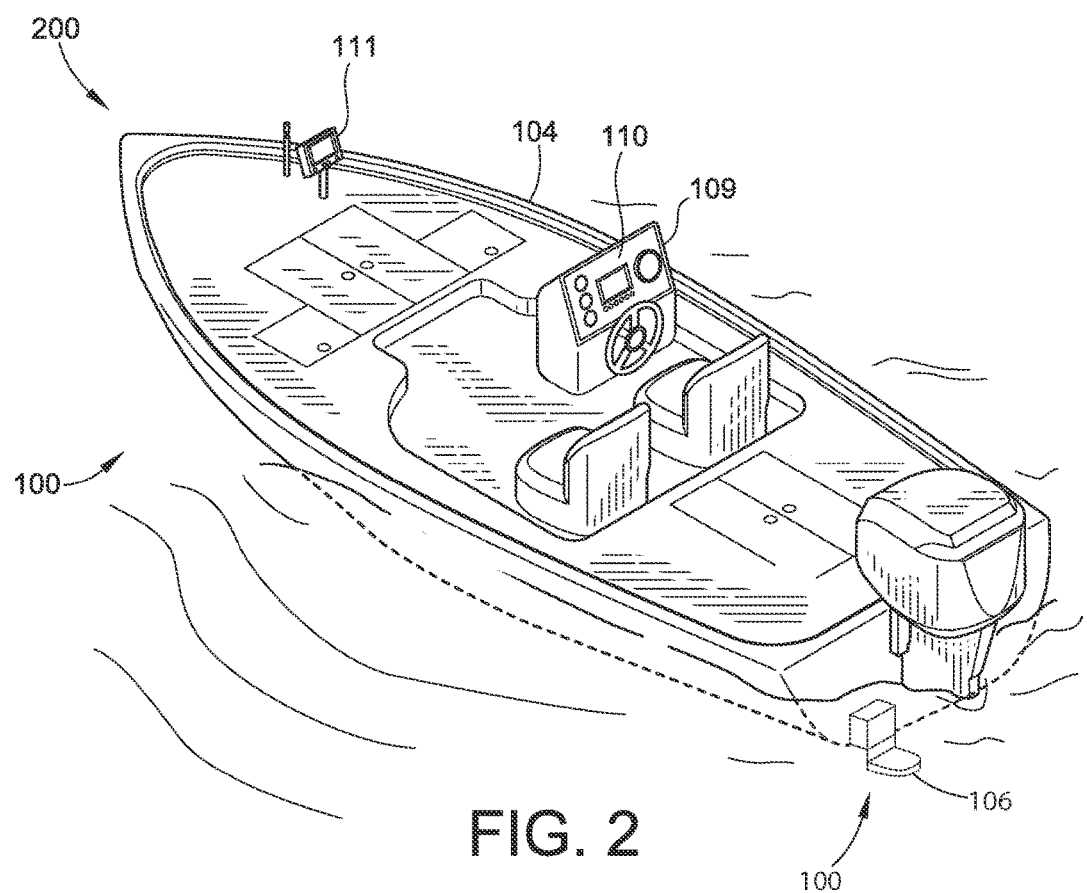
FIG. 2 is a pictorial illustration the sonar transducer assembly attached to a trolling motor, according to an embodiment of the invention.
Figure 3:
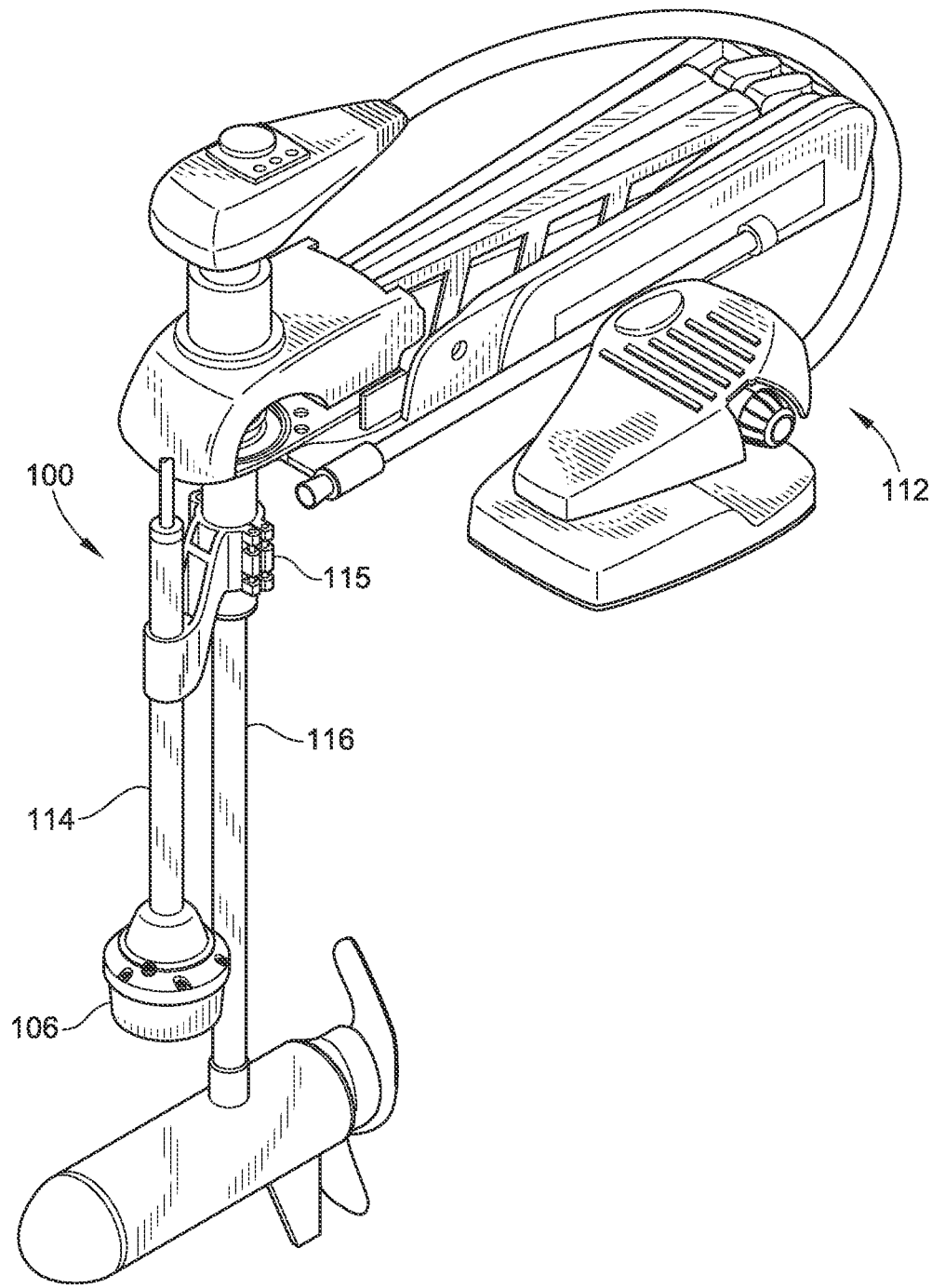
FIG. 3 is a pictorial illustration of the mounting and deployment of the sonar transducer assembly on a trolling motor, according to an embodiment of the invention.

FIGS. 1-3 show exemplary embodiment of a sonar transducer system according to embodiments of the invention. FIG. 2 shows a sonar mapping system 200 constructed in accordance with an embodiment of the invention. The sonar mapping system 200 includes a sonar imaging system 100 configured for mounting to various types of watercraft.

The sonar mapping system 200 includes a sonar transducer assembly 106, a control processor 110 and a sonar display. In the embodiment of FIG. 2, the sonar mapping system 200 is installed on a watercraft 104, illustrated as a motorized fishing boat 104. An optional second display 111 may be positioned at one of several different locations on the boat 104. FIG. 2 shows the second display 111 positioned towards the bow of the boat 104. In the embodiment of FIG. 2, the sonar imaging system 100, which includes the sonar transducer assembly 106, is deployed from the rear of the boat 104.

The control processor 110 is coupled to the sonar imaging system 100 and receives sonar data from the sonar transducer assembly 106. The processor is also coupled to a display. In certain embodiments such as illustrated in FIGS. 1-3 and described below, the sonar imaging system 100 can interface with a single control processor 110, or network with multiple control processors 110. The one or more control processors 110 may be integrated into the sonar transducer assembly 106, or may be installed in a control head, or command console, such as shown on the boat 104 of FIG. 2. When integrated in the sonar transducer assembly 106, the modular transducer assembly 106 and control processor 110 may be readily installed in a number of different types of watercraft 104. The sonar imaging system 100 may connect, via wired or wireless connection, to the processor 110 and display unit, although in other embodiments, this communication may take place using other wireless technologies, including, but not limited to Wi-Fi, Bluetooth, for example.

In certain embodiments, the sonar imaging system 100 includes a sonar transducer assembly 106 and one of several possible deployment mechanisms. When the sonar imaging system 100 is connected to the control processor 110, a variety of menus and views can be added to the existing user interface and rendered on the display. While the following will describe various embodiments of such a user interface, the examples are to demonstrate functionality.

FIG. 1 illustrates a sonar imaging system 100 deployed from the transom 113 of fishing boat 104, in accordance with an embodiment of the invention. In FIG. 1, the sonar imaging system 100 is shown in its retracted state in which the sonar transducer assembly 106 is close to the water line. However, phantom lines are used to show the sonar imaging system 100 in its deployed state, in which the sonar transducer assembly 106 is below the keel 108 of the boat 104. In some embodiments, the depth at which the sonar transducer assembly 106 is deployed is adjustable and set by the user. In the embodiment of FIG. 1, the sonar transducer assembly 106 is attached at the end of a shaft 105 that extends from, and retracts into, a housing 107. The interior of shaft 105 provides a path for cables from the sonar transducer assembly 106 to a control processor 110 (shown in FIG. 2).

The sonar transducer assembly 106 can be deployed in any number of ways, including but not limited to, automatically based on speed, or and locally via user controls on the transducer deployment system. In some embodiments, when the sonar imaging system 100 is in the process of deploying, a message will be displayed stating, for example, "Deploying transducer." When the sonar transducer assembly 106 reaches the set depth or the current limit, the deploying message will clear.

FIG. 3 shows an isolated view of the sonar imaging system 100 attached to the trolling motor 112. The sonar transducer assembly 106 is attached to the end of a shaft 114. In certain embodiments, the shaft 114 for the sonar transducer assembly 106 is coupled to a non-rotating portion of shaft 116 for the trolling motor 112 by a quick connecting clamp 115. In particular embodiments, the position of the sonar transducer assembly 106 is fixed with respect to the trolling motor 112. That is, the sonar transducer assembly 106 does not rotate with the trolling motor shaft 116, instead remaining stationary with respect to the boat. The sonar transducer assembly 106 may be deployed, at the bow of the boat 104, from the transom, or through the hull of the boat 104.

In one embodiment of the invention, the sonar imaging system 100 is a sweeping, or scanning, sonar system, also referred to as a 360-degree sonar imaging system. The sweeping/scanning sonar system may be configured to continually rotate the sonar transducer assembly 106 to provide a sonar image that includes a full 360-degree underwater view. Such 360-degree sonar imaging systems may be used to provide a picture-like image of the lake bed, river bed, or sea bed below and around the boat 104. The automatic charting function allows the user to create or update the image for a partial or entire body of water, and to store that image in memory for later recall. In other embodiments, the sonar imaging system 100 uses a sector-scanning device to image a predetermined portion of a 360-degree area.

In alternate embodiments, the sonar imaging system 100 has a stationary transducer arranged to provide 2-D sonar imaging. Though not shown explicitly in the drawings, one of ordinary skill in the art will recognize that the sonar imaging system 100 may be deployed through the hull of the watercraft 104 such that the sonar imaging system 100 extends below the keel of the boat 104 during operation. In some embodiments, this sonar imaging system 100 is designed to extend down from the hull during operation and to retract up against, or into, the hull when not being used.

For example, in particular embodiments, the sonar mapping system 200 may be configured such that the display with show retract and deploy messages. In certain embodiments, all retract and deploy messages are broadcast to any of the one or more control processor 110 that has the sonar transducer assembly 106 selected as one of its sonar sources.

Referring again to FIG. 2, the aforementioned control processor 110 for the sonar mapping system 200 is coupled to the sonar transducer assembly 106, and to the display in console 109 and to any additional displays, such as display 111. This coupling could be either wired or wireless depending on the sonar mapping system configuration. The control processor 110 is also coupled to, and able to access, electronic memory (not shown), which is configured to store charts or maps, along with sonar data from the sonar transducer assembly 106. The memory may be located proximate the control processor 110 or the display, in the console 109 for example, or may be located remotely from the both the display and the control processor 110. It is envisioned that this memory, accessible to the control processor, includes both fixed and portable forms of memory. Such portable memory includes, but is not limited to, flash memory, solid-state memory, including, but not limited to, thumb drives, SD cards, and may also include optical storage media, etc.

Figure 4:
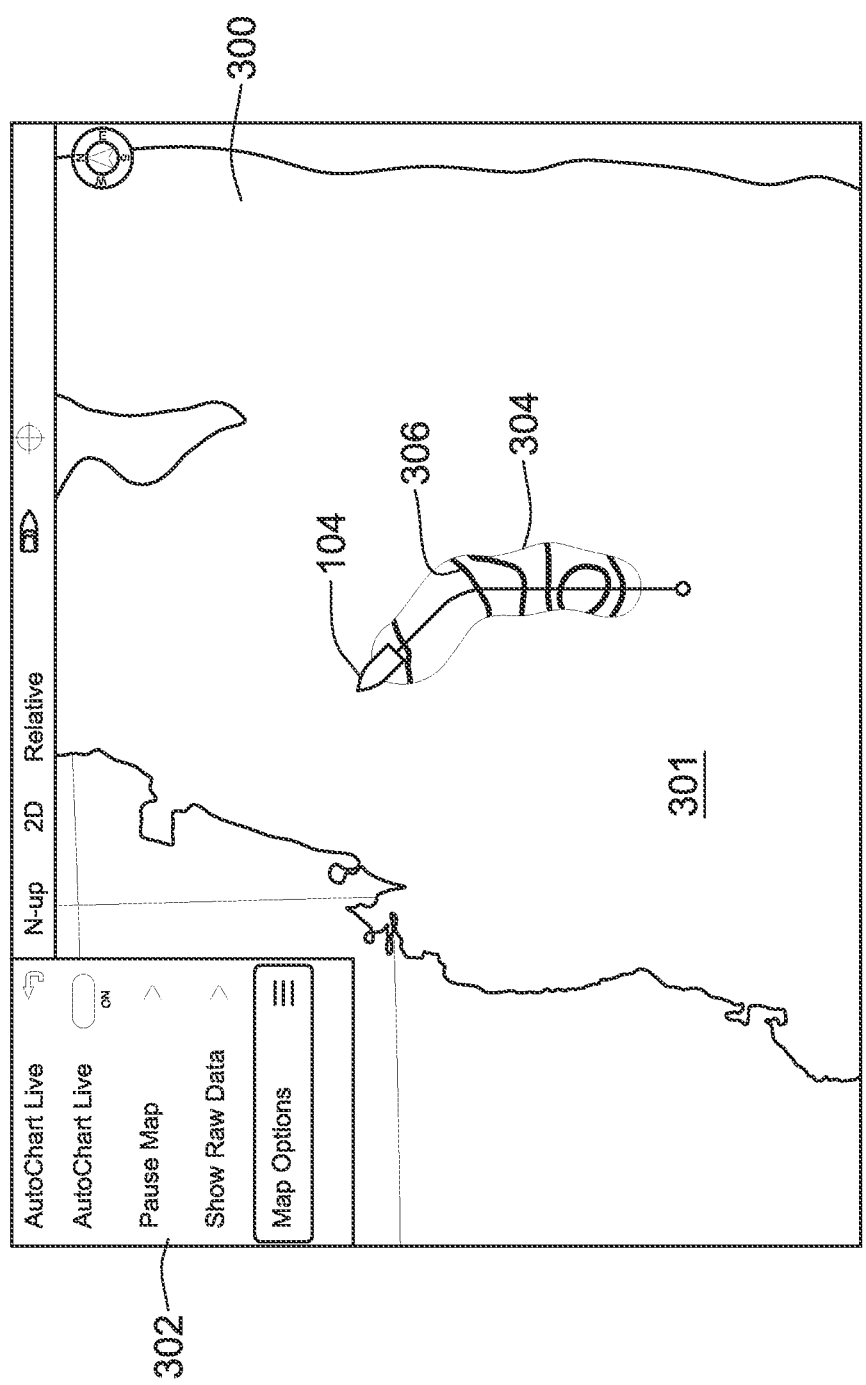
FIG. 4 is an exemplary screenshot of the display for the sonar mapping system, in accordance with an embodiment of the invention.
Figure 5:
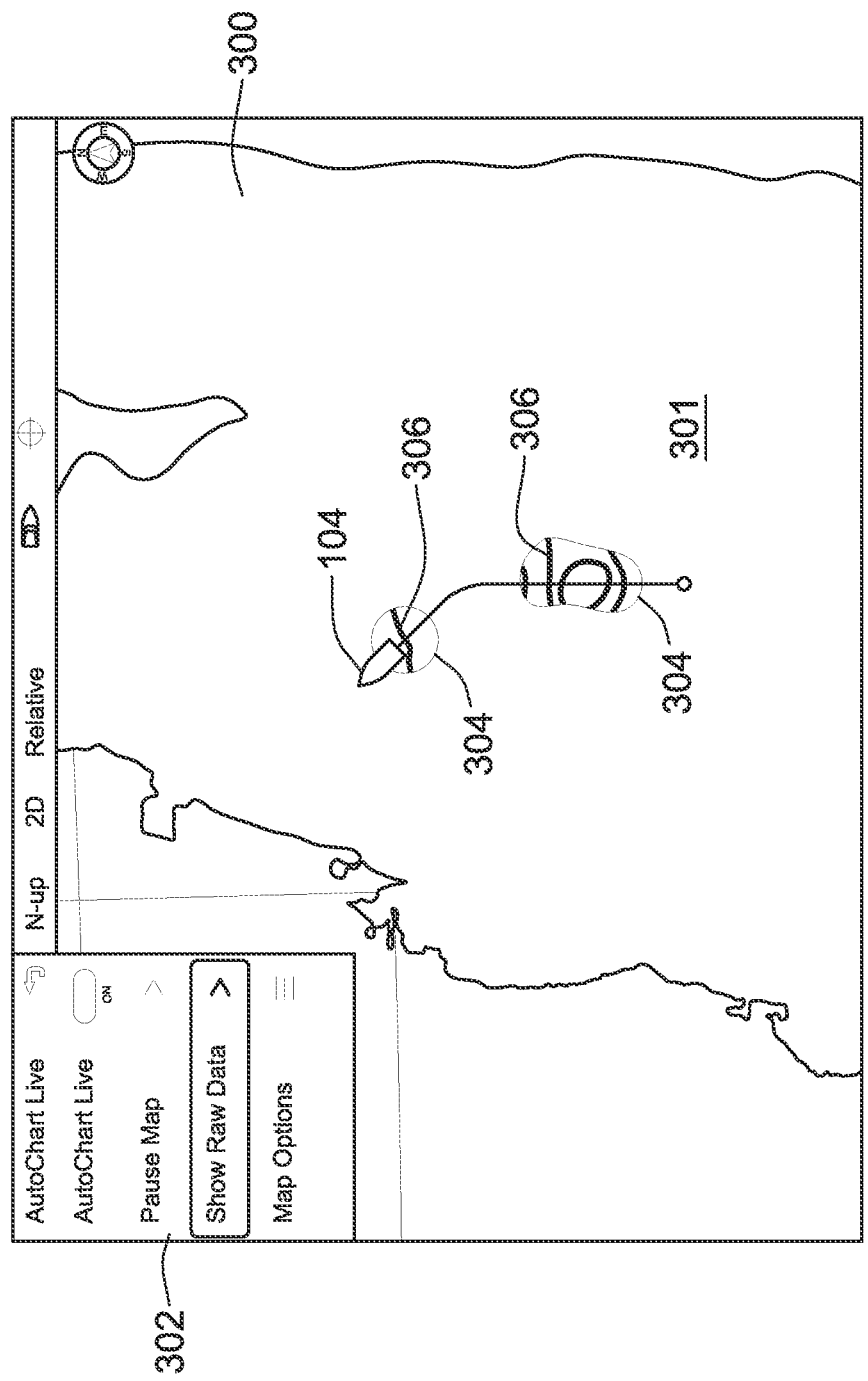
FIG. 5 is an exemplary screenshot of the display for the sonar mapping system, in accordance with an embodiment of the invention.

FIGS. 4-5 show exemplary screen shots of the display showing a chart 300 with topographical information provided by the sonar transducer assembly 106 (shown in FIGS. 1-3), in accordance with an embodiment of the invention. These figures also show elements of an exemplary graphical user interface 302 for the sonar mapping system 200 (shown in FIG. 2).

FIG. 4 shows an exemplary illustration of the chart 300 showing the boat 104 location after the automatic mapping function has been initiated. In a particular embodiment, the sonar mapping system 200 is configured to access the chart 300 in memory (not shown). Thus, the user may access, in memory, a desired chart for a body of water 301, for example the body of water on which the user is navigating.

When the automatic charting function is operating, the control processor 110 (shown in FIG. 2) is configured to update the chart 300 with topographical data 304 in real time based on sonar data provided by the sonar transducer assembly 106. The control processor 110 is also configured to render the updated chart 300 on the display. The embodiments of FIGS. 4 and 5 show topographical data 304 as it might appear if provided by the sonar imaging system 100 in FIG. 2, for example.

Additionally, the control processor 110 is configured to store these newly created or updated charts 300 in memory for later recall by the user. During each successive use of this chart 300, additional topographical data 304, for instance from an area of the body of water 301 not previously charted, can be added. Furthermore, the topographical data 304 gathered during previous charting sessions can be updated to reflect any changes in the topography of the lake bed, river bed, or sea bed, as the case may be.

In certain embodiments, the chart 300 may include topographical data 304 of the lakebed, seabed, or riverbed of the body of water 301 being navigated. In such a case, the automatic charting feature of the sonar mapping system 200 is configured to update the topographical data 304 in real time. However, it is envisioned that the automatic charting feature would be able to create from scratch a topographical map in real time for the floor of the body of water 301, for example using GPS coordinates, even when there is no available topographical data 304 in memory, or even if there is no chart 300 for the body of water 301 in memory before the automatic charting feature is engaged. Topographical data 304 may be displayed simultaneously, for example overlaid, with sonar imaging data.

The topographical data 304 may be in the form of a bathymetric chart with contour lines 306, as shown in FIGS. 4 and 5, where each contour line 306 indicates the location of a particular water depth for the body of water 301. Alternatively, the topographical data 304 may be in the form of a bathymetric tints or shading to indicate various depths in the body of water 301, where the color of the tints change as the underwater topography progresses from shallow to deep. The display may be configured to show the bathymetric chart with tints and/or contour lines 306 in various colors which are selectable by the user on the graphical user interface 302. Similarly, it is envisioned that the contour lines 306 may be customized via the graphical user interface 302 such that the contour lines 306 shown on the chart 300 indicate those depths selected by the user.

In particular embodiments, the control processor 110 (shown in FIG. 2) is also configured to use GPS data to show, on the display, the position of the watercraft 104, on the chart 300 for the body of water 301 being navigated, in relation to established landmarks or in relation to the boundaries of the body of water 301.

As stated above, if the chart 300 for the body of water 301 being navigated does not include topographical data 304, the sonar mapping system 200 can immediately create a topographical chart of the lakebed, riverbed, or seabed being navigated. With the automatic charting feature engaged, the sonar data for a portion of the lakebed, riverbed, or seabed is converted into topographical data by the processor. With a sufficient number of passes on the body of water 301, the entire floor of the body of water 301 can be charted. With each pass, the control processor 110 (shown in FIG. 2) performs a real-time update of the chart for the body of water 301 by adding contour lines 306, numerical displays, or bathymetric tints/shading to show water depths on the chart being displayed.

FIG. 5 shows topographical data 304 in two different spots along the path of travel for the boat 104. This may happen when the automatic charting function is paused for one reason or another. However, if the space between the charted areas is not too great, the control processor 110 may perform an interpolation function to estimate the missing topography between the two charted areas. In this manner, the topographical data 304 of FIG. 5 may be rendered as a closed approximation of the actual topographical data 304 as shown in FIG. 4 for example.

This same method may be employed to map the hardness, rather than the topography of the lakebed, riverbed, or seabed. Based on the strength of the sonar signal received by the sonar transducer assembly 106, the control processor 110 can create a chart, a color-coded chart for example, where the colors represent a spectrum of hardness for the lakebed, riverbed, or seabed surface. It is envisioned that, in certain embodiments, the graphical user interface 302 will allow the user to select the colors for this function.

Figure 6:
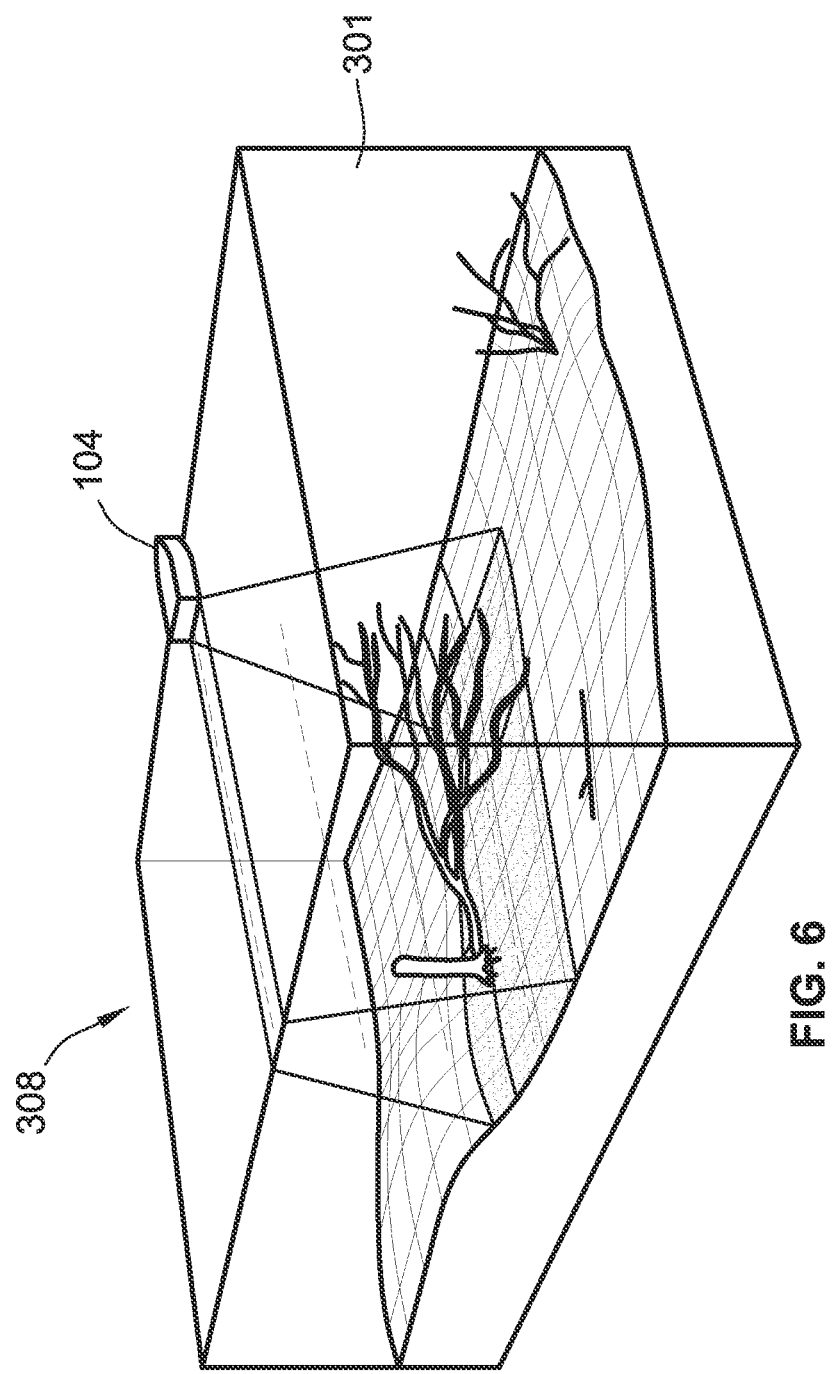
FIG. 6 is an exemplary 3-D rendering of an underwater topographical chart, according to an embodiment of the invention.

Further, embodiments of the invention are able to generate and display a 3-D topographical map 308 of a body of water in real time based on the sonar data collected by the sonar transducer. FIG. 6 shows an exemplary rendering of the 3-D topographical map 308 along with the position of the boat. With the appropriate sonar transducer assembly 106, particular embodiments of the invention provide the user with the ability to create or update the 3-D topographical map 308 on the display and to save the created or updated 3-D topographical map 308 to memory. As in the previously-discussed embodiments, the graphical user interface 302 may be configured to allow the user to select the colors for the 3-D topographical map 308.

The control processor 110 (shown in FIG. 2) and the graphical user interface 302 are configured such that the user of the sonar mapping system 200 (shown in FIG. 2) can adjust the display in a variety of ways including, but not limited to transparency level, color, sensitivity, contrast, etc. In a particular embodiment of the invention, the user can select from one of several drawing modes where the sonar data from the sonar transducer assembly 106 overwrites the original chart data, overwrites previously-acquired sonar data, or is blended with original or previously-acquired sonar data. The control processor 110 may also include a feature in which sonar data with greater intensity replaces sonar data with lower intensity.

FIG. 7 is an exemplary screen shot illustrating the look of the display when the automatic charting feature is used with the aforementioned 360-degree sonar imaging system. A chart 310 is created or updated to include 360-degree sonar imaging data 314, which shows underwater images for a 360-degree area surrounding the boat 104 for the body of water 301. In the embodiment of FIG. 7, the 360-degree sonar imaging data 314, which resembles a series on non-concentric circles, may be in the form of a bathymetric tints or shading to help indicate various underwater features or objects imaged from boat 104 in the body of water 301. In some embodiments, the colors of the bathymetric tints are selectable by the user of the sonar mapping system 200 (shown in FIG. 2).

With the automatic charting feature engaged, the sonar data is gathered for some portion of the lakebed, riverbed, or seabed and converted into imaging data by the control processor 110. With a sufficient number of passes on the body of water 301, the entire floor of the body of water 301 can be imaged. With each pass, the control processor 110 (shown in FIG. 2) performs a real-time update of the chart 310. The 360-degree sonar imaging data 314 can be stored in memory for later recall by the user, and can also be displayed simultaneously, for example overlaid, with charts or topographical data previously stored in memory. A similar process could be employed to store sonar imaging data captured using a sector scanning device to capture a portion of a 360-degree area surrounding the boat 104.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A sonar mapping system comprising:
   a sonar transducer assembly configured for mounting on a watercraft;
   a display configured to show a topographical chart of a body of water;
   a processor coupled to the sonar transducer assembly and display, and configured to create the topographical chart in real time, or to update the topographical chart in real time, based on sonar data provided by the sonar transducer assembly, the processor being configured to render the created or updated topographical chart on the display; and
   memory accessible by the processor and configured to store the topographical chart rendered by the processor, and to store the sonar data provided by the sonar transducer assembly.

2. The sonar mapping system of claim 1, wherein the processor is configured to estimate topographical data to fill in missing portions of topographical data adjacent the topographical data gathered via the sonar transducer assembly.

3. The sonar mapping system of claim 1, wherein the topographical data includes one or more contour lines indicative of a water depth.

4. The sonar mapping system of claim 1, wherein the topographical data includes bathymetric tints indicative of a water depth.

5. The sonar mapping system of claim 4, wherein colors of the bathymetric tints are selectable by a user.

6. The sonar mapping system of claim 1, wherein the topographical data includes bathymetric tints indicative of a hardness of the lakebed, riverbed, or seabed surface.

7. The sonar mapping system of claim 6, wherein colors of the bathymetric tints are selectable by a user.

8. The sonar mapping system of claim 1, wherein a chart for a body of water is stored in the memory; and
wherein the processor updates topographical or bathymetric data for the chart based on the sonar data provided by the sonar transducer assembly.

9. The sonar mapping system of claim 1, wherein the processor is configured to generate a 3-D rendering based on sonar data collected by the sonar transducer assembly, and wherein the 3-D rendering is shown on the display.

10. The sonar mapping system of claim 9, wherein a user can save the 3-D rendering in the memory.

11. The sonar mapping system of claim 9, wherein different features of the 3-D rendering are shown in different colors.

12. The sonar mapping system of claim 11, wherein colors are selectable by a user of the sonar mapping system.

13. The sonar mapping system of claim 1, further comprising a connection for a portable memory device, wherein the processor is configured to access portable memory device.

14. The sonar mapping system of claim 1, wherein updating the topographical chart in real time comprises overwriting stored topographical data with new topographical data acquired and converted form sonar data in real time.

15. The sonar mapping system of claim 1, wherein the processor is integrated into the sonar transducer assembly.

16. A sonar mapping system comprising:
   a sonar transducer assembly configured for mounting on a watercraft, and configured to provide sonar data for a 360-degree area surrounding the watercraft;
   a display configured to show underwater images based on data from the sonar transducer assembly;
   a processor coupled to the sonar transducer assembly and to the display, the processor configured to convert sonar data from the sonar transducer assembly into the underwater images rendered on the display, wherein the processor is also configured to overlay the underwater images, in real time, onto a previously-stored chart for a body of water, or to create a new chart, in real time, that includes the underwater images;
   memory accessible by the processor, wherein the processor is configured to store, in the memory, the new chart with underwater images or the previously-stored chart with overlaid underwater images.

17. The sonar mapping system of claim 16, wherein the underwater images are shown on the display as bathymetric tints in which different features of the underwater images are represented by a plurality of colors.

18. The sonar mapping system of claim 17, wherein at least one of the plurality of colors is selectable by a user of the sonar mapping system.

* * * * *